United States Patent
Reddy Arava et al.

(10) Patent No.: US 12,062,799 B2
(45) Date of Patent: Aug. 13, 2024

(54) FABRICATION OF MICRO/MILLIMETER-SCALE POWER SOURCES AND THE PROCESS FLOW THEREFOR

(71) Applicant: Wayne State University, Detroit, MI (US)

(72) Inventors: Leela Mohana Reddy Arava, Farmington Hills, MI (US); Nirul Masurkar, Detroit, MI (US); Babu Ganguli, Houston, TX (US)

(73) Assignee: Wayne State University, Detroit, MI (US)

( * ) Notice: Subject to any disclaimer, the term of this patent is extended or adjusted under 35 U.S.C. 154(b) by 355 days.

(21) Appl. No.: 16/755,174

(22) PCT Filed: Oct. 9, 2018

(86) PCT No.: PCT/US2018/055088
§ 371 (c)(1),
(2) Date: Apr. 10, 2020

(87) PCT Pub. No.: WO2019/074976
PCT Pub. Date: Apr. 18, 2019

(65) Prior Publication Data
US 2021/0288364 A1    Sep. 16, 2021

Related U.S. Application Data

(60) Provisional application No. 62/571,817, filed on Oct. 13, 2017.

(51) Int. Cl.
*H01M 50/159* (2021.01)
*H01M 4/38* (2006.01)
(Continued)

(52) U.S. Cl.
CPC ........ *H01M 50/159* (2021.01); *H01M 4/386* (2013.01); *H01M 4/505* (2013.01);
(Continued)

(58) Field of Classification Search
CPC .. H01M 50/159; H01M 50/15; H01M 50/147; H01M 50/186; H01M 4/386; H01M 4/505; H01M 4/525; H01M 2010/0495
See application file for complete search history.

(56) References Cited

U.S. PATENT DOCUMENTS

| | | |
|---|---|---|
| 3,841,913 A | 10/1974 | Anderson |
| 5,279,905 A | 1/1994 | Mansfield, Jr. et al. |

(Continued)

FOREIGN PATENT DOCUMENTS

| | | |
|---|---|---|
| EP | 2690687 A1 | 1/2014 |
| WO | 2017/055984 | 4/2017 |

OTHER PUBLICATIONS

International Search Report dated Jan. 8, 2019 for copending International Application No. PCT/US2018/55088.
(Continued)

*Primary Examiner* — Matthew T Martin
*Assistant Examiner* — Ankith R Sripathi
(74) *Attorney, Agent, or Firm* — Fishman Stewart PLLC

(57) ABSTRACT

A power source for a micro-device is provided. The power source may include a cup, a lid and electrolytes. The cup may be formed of a hard metal material and walls of the cup may define a cavity. An opening in the cup may provide access to the cavity and a surface of the cavity may be deposited with one of an anode or cathode material. The lid may be formed of a hard metal material, the lid may cooperate with the cup to fit into the opening closing off the
(Continued)

cavity. The cavity may be coated with the other of the anode or cathode material. Electrolytes may be contained in the cavity.

19 Claims, 8 Drawing Sheets

(51) Int. Cl.
    *H01M 4/505*     (2010.01)
    *H01M 4/525*     (2010.01)
    *H01M 10/04*     (2006.01)
    *H01M 50/147*     (2021.01)
    *H01M 50/186*     (2021.01)
    *H01M 50/193*     (2021.01)

(52) U.S. Cl.
    CPC .......... *H01M 4/525* (2013.01); *H01M 50/147* (2021.01); *H01M 50/186* (2021.01); *H01M 50/193* (2021.01); *H01M 2010/0495* (2013.01)

(56) References Cited

U.S. PATENT DOCUMENTS 6,586,133 B1     7/2003     Teeters et al.

| | | | |
|---|---|---|---|
| 2003/0049537 A1* | 3/2003 | Wadley | H01M 10/345 29/623.5 |
| 2005/0147880 A1* | 7/2005 | Takahashi | H01M 50/531 429/176 |
| 2012/0114986 A1* | 5/2012 | Kim | H01M 50/131 429/61 |
| 2013/0196222 A1* | 8/2013 | Brenner | H01M 50/109 429/185 |
| 2015/0037660 A1* | 2/2015 | Bedjaoui | H01M 10/0585 156/60 |
| 2016/0093895 A1 | 3/2016 | Du et al. | |
| 2018/0254439 A1* | 9/2018 | Fischer | H01M 50/109 |
| 2021/0119284 A1* | 4/2021 | Wiedemann | H01M 50/46 |

OTHER PUBLICATIONS

Do JS, Yu SH, Cheng SF. "Preparation and characterization of thick-film Ni/MH battery". Biosensors and Bioelectronics, 2004, pp. 61-67, vol. 20. doi:10.1016/j.bios.2003.11.029.

Humble, Paul & Harb, John. "Optimization of Nickel-Zinc Microbatteries for Hybrid Powered Microsensor Systems". Journal of The Electrochemical Society, 2003, pp. A1182-A1187, vol. 150.

English Abstract for EP2690687.

* cited by examiner

FABRICATION OF MICRO/MILLIMETER-SCALE POWER SOURCES AND THE PROCESS FLOW THEREFOR

RELATED APPLICATIONS

This application is a national phase application of and claims priority to International Patent Application No. PCT/US2018/055088, filed Oct. 9, 2018, which claims the benefit of U.S. Provisional Patent Application No. 62/571,817, entitled "Fabrication Of Micro/Millimeter-Scale Power Sources And The Process Flow Therefor," filed Oct. 13, 2017, the contents of each of which is hereby incorporated by reference in their entirety.

BACKGROUND

In recent years, electronic industries are breaking previous boundaries of integration and functional density towards miniaturization in autonomous self-powered micro devices. These micro/nano machines are suitable to operate as well as interconnect in different environments to provide, process and store information without connected to any power grids. The autonomous devices should operate in natural, industrial or any in vivo application of human body. As self-directed systems are shrinking day by day, energy storage system required to fit into demand of dimensions and requirement of such small devices.

SUMMARY

A power source for a micro-device is provided. The power source may include a cup, a lid, electrodes, electrolytes and insulating epoxies. The cup may be formed of a hard metal material and walls of the cup may define a cavity. An opening in the cup may provide access to the cavity and a surface of the cavity may be deposited with one of an anode or cathode material. The lid may be formed of a hard metal material, the lid may cooperate with the cup to fit into the opening closing off the cavity. The cavity may be coated with the other of the anode or cathode material. Electrolytes may be contained in the cavity. The electrochemically and thermally stable dielectric material may be used to physically distinct and seal the cup and lid.

DETAILED DESCRIPTION

Figure 1A:
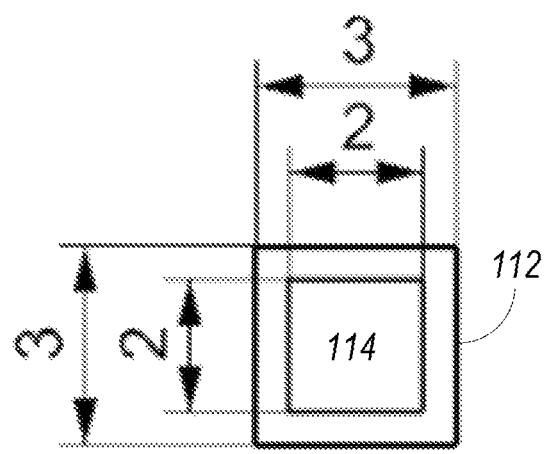
FIG. 1A is a top view of a cup for a power source.
Figure 1B:
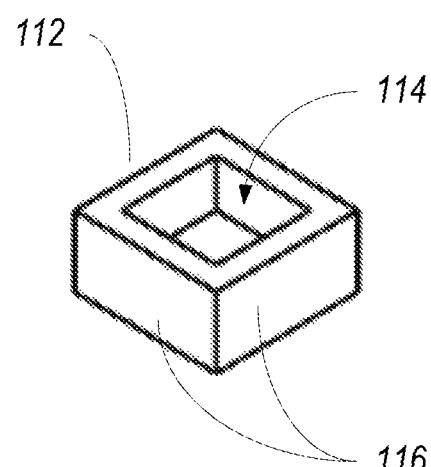
FIG. 1B is a perspective view of the cup for the power source.
Figure 1C:
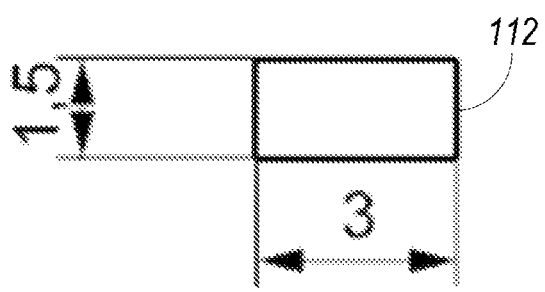
FIG. 1C is a side view of the cup for the power source.
Figure 2A:
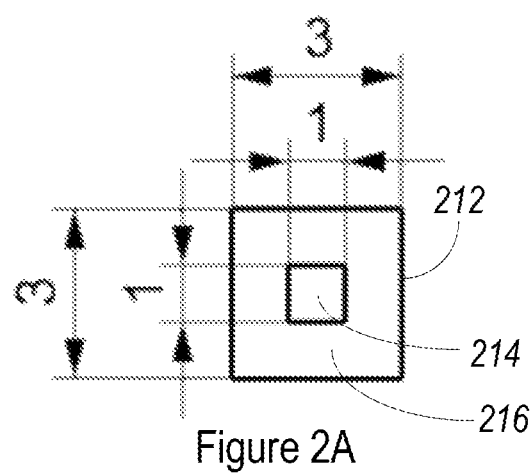
FIG. 2A is a top view of a lid for a power source.
Figure 2B:
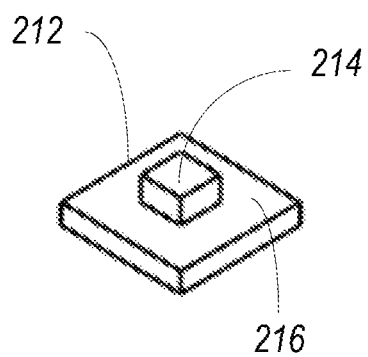
FIG. 2B is a perspective view of the lid for the power source.
Figure 2C:
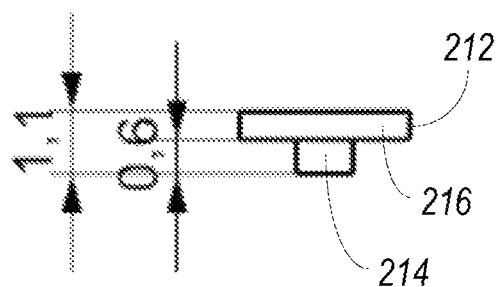
FIG. 2C is a side view of the lid for the power source.

FIG. 1A is a top view, FIG. 1B is a perspective view, and FIG. 1C is a side view of a cup for a power source. The cup 112 has a cavity 114 formed by walls 116. FIG. 2A is a top view, FIG. 2B is a perspective view, and FIG. 2C is a side view of a lid for a power source. The lid 212 has a protrusion 114 that extends from a base 116.

Figure 3A:
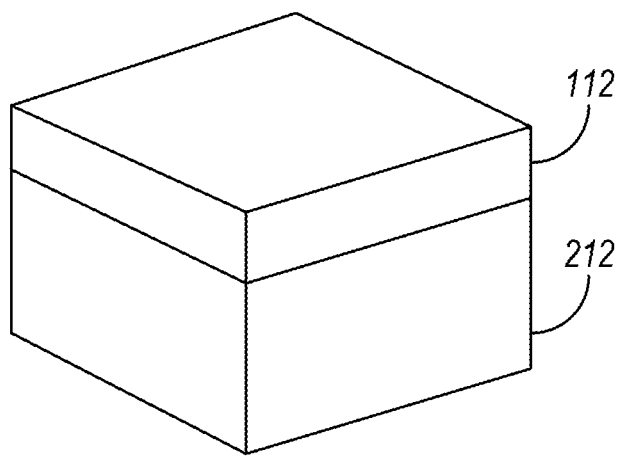
FIG. 3A is a perspective view of the cup and lid assembled.
Figure 3B:
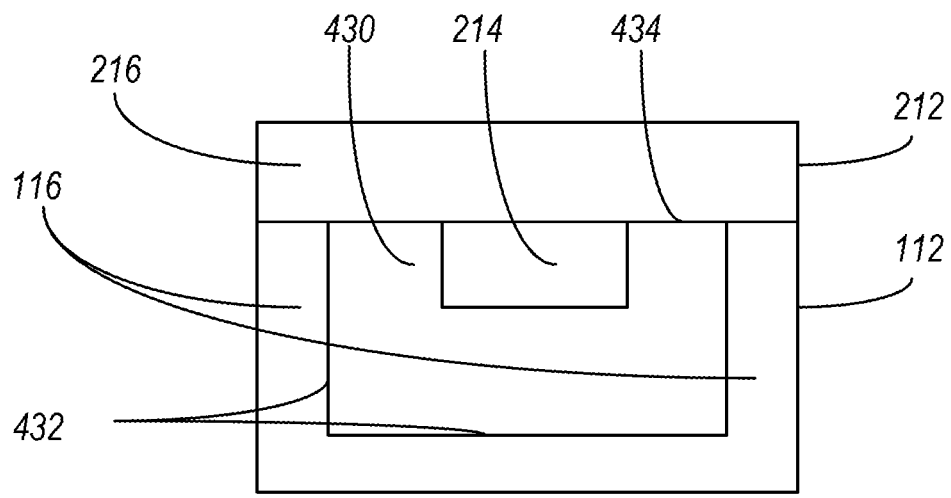
FIG. 3B is a side view of the cup and lid assembled.

FIG. 3A is a perspective view and FIG. 3B is a side view of the cup and lid assembled. The lid 212 may cover the cavity 114 in the cup 112. The base 216 may be seated on the walls 116 of the cup 112. Epoxy, adhesive, or another non-conductive fastener may seal the area between the base 216 of the lid 212 and the walls 116 of the cup 112. The protrusion 214 of the lid 212 may extend into the cavity 114 of the cup 112. A electrolytes (and possible a separator) 430 may be inserted into cavity 114 between the lid 212 and the cup 112. An anode or cathode coating may be applied on the surfaces of the protrusion 214 and the bottom surface 434 of the base 216. The bottom and side surfaces 432 of the cup 112 may be coated with the other of the anode or cathode coating. For example if the cup has the anode coating then the lid would have the cathode coating and if the cup has the cathode coating then the lid would have the anode coating. While the power source may be provided in various sizes and shapes. A rectangular or square shape may be particularly beneficial for this device, particularly in SMT implementations. Although, round or polygonal shapes may be utilized.

In one aspect of the disclosure, the power source for a micro-device is provided. The power source may be a battery, supercapacitor, or other power storage device. The power source may include a cup, a lid, electrolytes, and a dielectric material. The cup may be formed of a hard metal material and walls of the cup may define a cavity. An opening in the cup may provide access to the cavity and a surface of the cavity may be deposited with one of an anode or cathode material. The lid may be formed of a hard metal material, for example the same material as the cup. The lid may cooperate with the cup to fit into the opening closing off the cavity. The lid may be deposited with the other of the anode or cathode material. For example, the cup may be deposited with the anode material and the lid may be deposited with the cathode material or the cup may be deposited with the cathode material and the lid may be deposited with the anode material.

The electrolytes may be contained in the cavity. The dielectric material may be positioned between the cup and the lid to electrically isolate the cup from the lid. The power source may include an epoxy for sealing the opening in the space between the cup and the lid. The lid may include a protrusion that extends into the cavity. The cathode material may comprise at least one of $LiFePO_4/C$, $LiMn_2O_4$, $LiNi_{1/3}Mn_{1/3}Co_{1/3}O_2$. The anode material may comprise at least one of Si, Sn, graphite, and Li. The thickness of the walls may be between 50 nanometers and 250 nanometers. The cup may comprise at least one of stainless steel, Cu, and Al. The lid may comprise at least one of stainless steel, Cu, and Al. The dielectric may be deposited onto the cup or the lid. The electrolyte may be filled in the cavity without using separators. The cavity may filled with a separator that is wetted with thermally stable electrolytes. The cavity may be filled with solid or semi-solid electrolytes.

In another aspect of the disclosure, a method for forming a power source may be provided. The method may include forming the cup, forming the lid, providing electrolytes, providing a dielectric and sealing the cup and lid. The cup may be formed from a hard metal material, wherein walls of the cup defining a cavity and an opening in the cup providing access to the cavity. The lid may be formed from a hard metal material, wherein the lid is shaped to cooperate with the cup to fit into the opening closing off the cavity. The electrolytes may be filled into the cavity. The dielectric may be provided between the cup and the lid. The cup may be sealed to the lid to contain the electrolytes in the cavity. At least one of the lid and the cup may be 3D-printed. The thickness of the walls may be printed to between 50 nanometers and 250 nanometers.

International Technology Roadmap of Semiconductors (ITRS) forecasts the power consumption in semiconductor industries will be big issue. As circuits shrinks, they requires higher chip operating frequencies, higher interconnects resistance and capacitance as well as gate leakage contribute to increase power requirement in microprocessor units. Semiconductors may be based on micro-electro mechanical system (MEMS) technology to match up the load for making portable devices. Innovations in the miniaturization of autonomous electronic devices and sensors have lead towards the miniaturization of power technologies. For harvesting the energy in these devices, few strategies have been commenced which includes study of energy conversion devices (piezoelectric generators, photovoltaics, thermoelectric, thermostatic and etc) and energy storage devices (e.g. batteries). Though, energy conversion may require an intermittent source of power as well as batteries. Hence, the improvement of a miniaturized energy storage system with large volumetric density may be of essential importance for electronics systems and MEMS applications (like polymer electronics, smart cards, smart sensor, medical implants, transmitters, RFID tags and etc.).

However present miniaturized commercial batteries have several serious limitations including (i) areal energy ($\mu Ah/cm^2$), (ii) size (around 80 $mm^2$) and (iii) thermal stability (up to 85° C.). In addition, several microsensors acquiring real time information related to pressure, temperature etc., at extreme environmental conditions demand highly reliable microbatteries sustaining temperatures above 120° C., pressures up to 10,000 psi and delivering power in the order of few $mAh/cm^2$.

This disclosure focusses on the miniaturized power source (e.g. battery) packaging by using 3D printer for high temperature (120° C.) autonomous microsystem devices. Batteries may contain electrochemically active components which need to be protected from moisture, air and mechanical stresses.

Packaging battery components within micro/millimeter configurations is challenging for high temperature applications as the smallest packaging components available in market are 7.7D×3.4H mm. Hence machining methodology and limitations have been explored in depth to design casings that are compatible with the electrochemical reactions.

Materials and Methods

Stainless steel casing may be fabricated by using 3D printing techniques. Due to the variation in the nature of electrode/electrolyte materials used, individual components of the battery may be processed using customized methods. In case of electrodes, several fabrication parameters to maintain good adhesion have been optimized with current collector while having high conductivity and essential continuity. For an electrolyte and separator, the major requirements are as follows i) thermal stability with electrode materials, ii) electrochemical stability over the potential range (2.5-4.5 V) and thermal stability (>120° C.). These parameters may be optimized further to assemble them in microscale.

3D Printing Techniques

In 3D printing, miniaturized battery casings of dimension in micro/millimeter may be fabricated. This battery casing may contain two parts, a bottom case to hold the cathode material and a top case for anode material, an extrusion may be added to the top case which aids in sufficient contact pressure between the anode and cathode material.

Assembly Battery Components

Silicon Anode by PECVD

The conformal coating of silicon on the SS lid may be done using plasma-enhanced chemical vapour deposition (PECVD) technique. The PECVD technique may be tailored by adjusting deposition time, flow rate and power etc. so that deposition of 100 nm of silicon is equivalent to planar thicknesses on SS lid under vacuum $LiFePO_4$/C Cathode by Spray Coating Method Spray ink may be prepared by mixing synthesized powder with super P carbon black and polyvinylidene fluoride (binder) in 80:10:10 ratios respectively and the mix may be treated with N-Methylpyrrolidin-2-one (NMP) solvent to form an ink. The ink may be filled in a spray gun and applied uniformly on a bottom cases and then dried. The ratios of NMP and electrode mixtures, spray time, drying temperature etc. may be adjusted to get desired coating of $LiFePO_4$/C cathode on respective bottom cases.

RTIL/BN Electrolytes by Painting and Injection Methods

The most critical sources of problems for the reliable operation of a LIB at high temperatures may be the separator and the electrolyte. With increase in temperature beyond 80° C., thin polymeric film and organic solvents may be thermally unstable, subsequently the cell may be more prone to failure and there may be safety concerns, exemplified with battery blow-up situations. In this regard, the composite of natural boron nitride (BN) and ionic liquid (RTIL) may be used which can simultaneously act as electrolyte and separator, allowing a battery to work at temperatures as high as 200° C. However, we have systematically adjusted the composite during their preparation to suit in our mm scale batteries.

Fabrication Using 3D Printed Casings: Urethane Sealant

Generally, urethane epoxies may be used to protect integrated circuits (IC) from chemical, moisture, salts, biologic organisms, atmospheric contaminates and at same time to providing mechanical strength. Herein, we can use urethanes epoxies (Oxirane, 2,2-[(1-methylethylidene) bis(4,I phenyleneoxymethylene)] bis,homopolymer) to seal our mm batteries. The important characteristics of this epoxy are that "it cures at room temperature" and it gives conformal coating and sealed hermetically. Also, Limestone may be used as another main component in this epoxy to reduce coefficient of temperature expansion. Moreover, it has been found chemically resistant to most of organic solvents and thermally stable up to 200° C.

Results and Discussion

Battery may comprise electrochemically active components which need to be protected from moisture, air and mechanical stresses; therefore, in-order to protect and retain the material characteristics, packaging these materials in a confined enclosure may be of high priority. One of important the parameters to fabricate micro/mm-scale lithium batteries can be epoxy or sealant or adhesive, which would electrically isolate cathode and anode casings and at same time to bind them tightly to regulate liberated electrons for external circuit.

The Performance of Lithium Ion Battery (4 mm)

Prior to fabricating 3 mm battery at 120° C., rechargeable lithium batteries may be fabricated and tested using 4 mm casings (inside the glove box) to verify the feasibility of electrode/electrolyte materials with down-size packaging.

Figure 4:
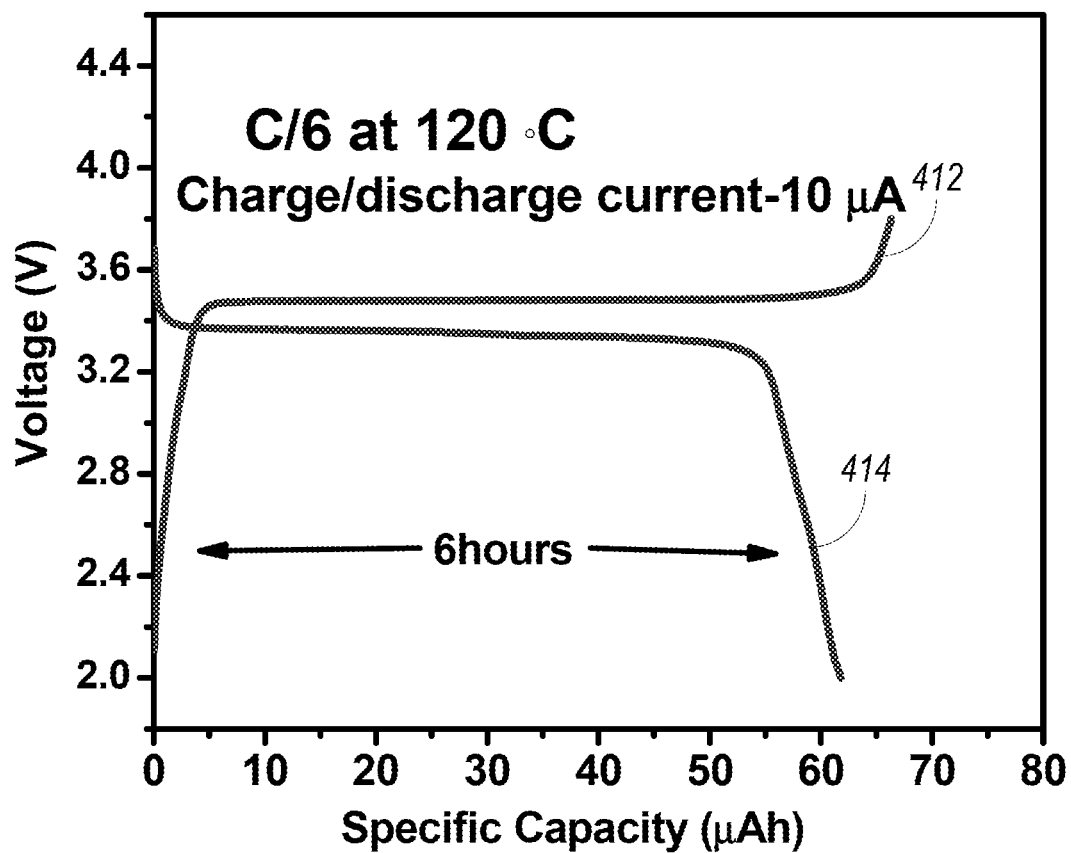
FIG. 4 is graph illustrating the charge and discharge attributes of the power source at 120° C. for 10 µA.
Figure 5:
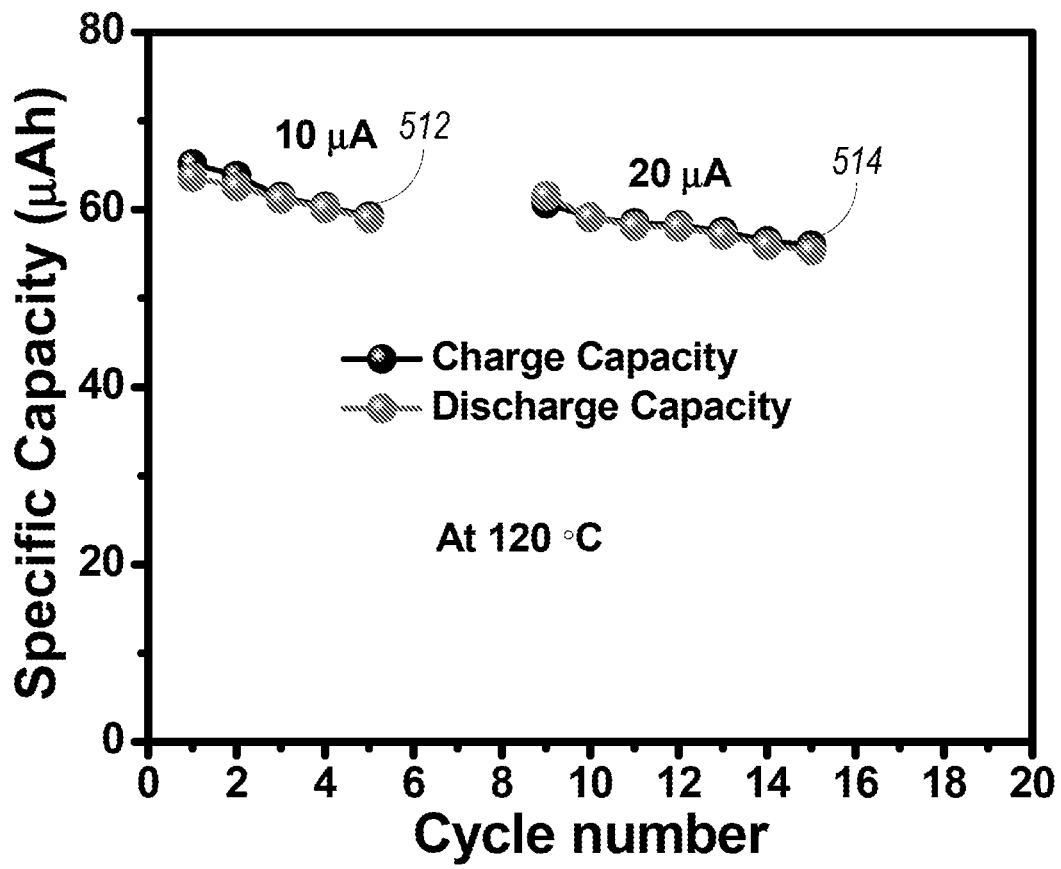
FIG. 5 is graph illustrating the charge and discharge attributes of the power source at 120° C. for 10 µA and 20 µA.

FIG. 4 is graph illustrating the charge and discharge attributes of the power source at 120° C. for 10 µA. Line 412 illustrates the charging profile of the power source and line 414 illustrates the discharging profile of the power source. FIG. 5 is graph illustrating the charge and discharge attributes of the power source at 120° C. for 10 µA and 20 µA. Line 512 illustrates the charging/discharging profile for 10 µA and line 514 illustrates the charging/discharging profile for 20 µA.

FIG. 4 shows electrochemical performance of 4 mm battery sealed using urethane epoxy consists of LiFePO$_4$/C cathode vs. Li/Li+ at C/6 rate. The perfect and well defined charge-discharge voltage plateaus were observed, wherein the appearance of 3.4 V plateaus indicates the Li+ extraction and insertion reaction between LiFePO$_4$ and FePO$_4$ phase. Among the different epoxies used to seal the mm-scale batteries, cells sealed with urethane epoxy exhibits higher discharge capacity (62 µAh) value and minimum polarization (less internal resistance). The discharge capacity of such a urethane epoxy sealed battery exhibits 62 µAh at 120° C. with excellent capacity retention. Herein, the magnitude of capacity is inferior compared to the batteries sealed with other epoxies, which could be corroborated to the chemical and thermal stability of urethane epoxy and added limestone as an additive.

3.2 The Performance of Lithium Ion Battery (3 mm)

Figure 6A:
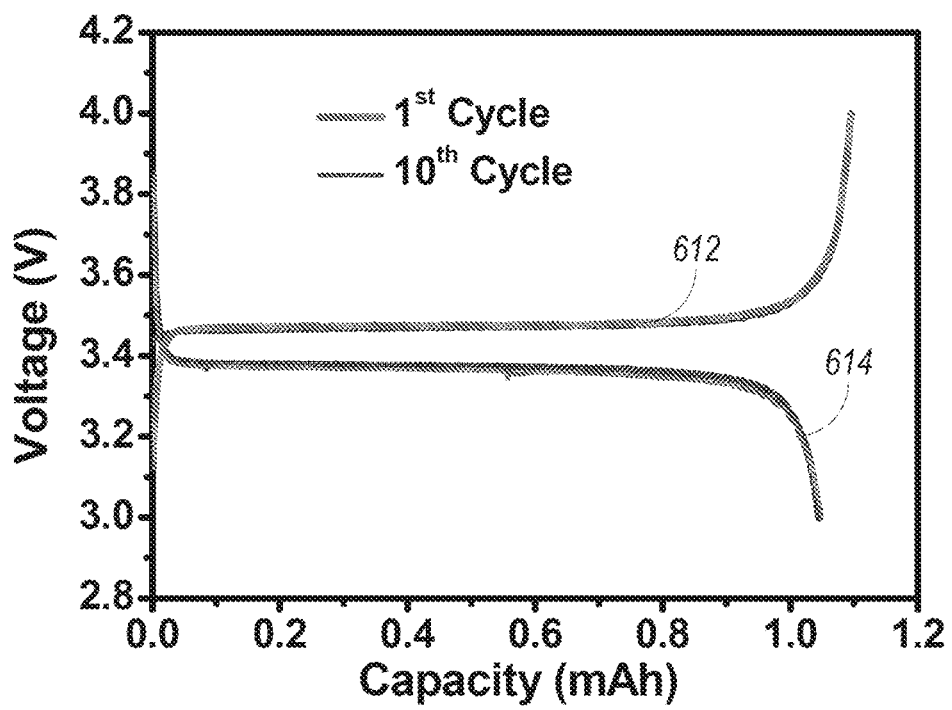
FIG. 6A is graph illustrating the charge and discharge attributes of a standard battery.
Figure 6B:
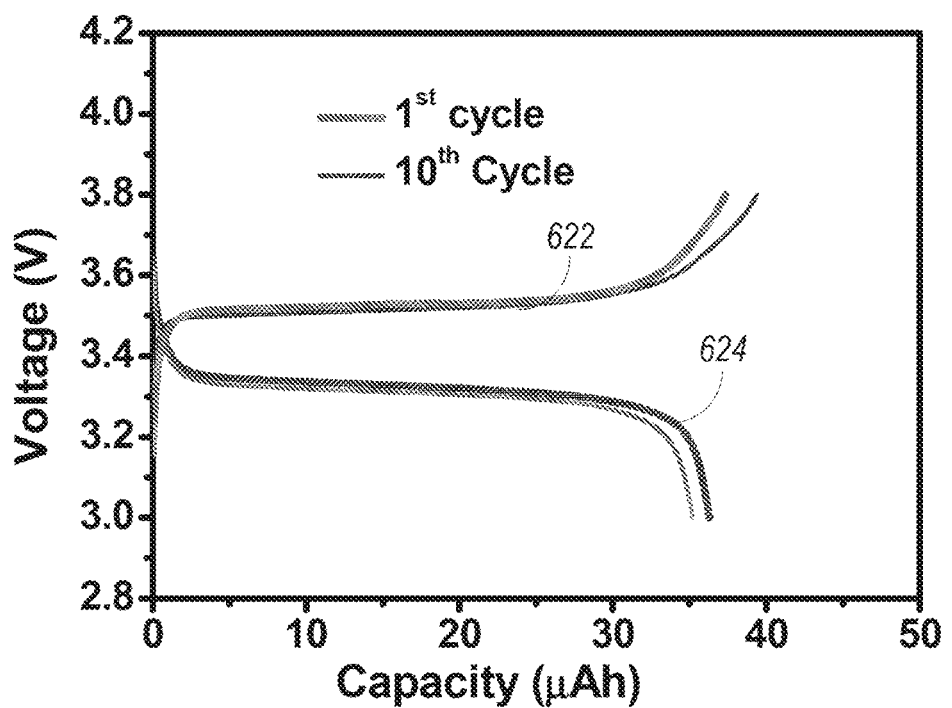
FIG. 6B is graph illustrating the charge and discharge attributes of the disclosed power source.

FIG. 6A is graph illustrating the charge and discharge attributes of a standard battery and FIG. 6B is graph illustrating the charge and discharge attributes of the disclosed power source. To understand the effect of optimized components for downsize packaging and hence overall electrochemical properties on 3 mm batteries, we have compared the present results with standard 2032 (20 mm) battery packages tested at 120 C (for controlled experiments). All these experiments are performed using similar electrode and electrolytes materials and obtained results are shown in FIGS. 6A and 6B. Line 612 illustrates the charge curve and line 614 illustrates the discharge curve for the standard battery. Line 622 illustrates the charge curve and line 612 illustrates the discharge curve for the disclosed power source. Both the type of batteries are fabricated under inert atmosphere (Ar filled glove box) using Li metal anode and BN-RTIL electrolyte and LFP as an active material and quartz membrane as a separator. Galvanostatic measurements conducted at a constant current rate of 0.2 C and 20 µA for 20 mm and 3 mm batteries respectively. 3 mm battery is capable of exhibit 1 mAh. Electrochemical impedance (EIS) tests were performed Bio-Logic electrochemical work station in the frequency range 100 MHz to 100 mHz. Typical Nyquest impedance spectra for 20 and 3 mm batteries are composed of a semicircle at high frequencies attributed to the charge transfer resistance. The unfinished semicircle with short inclined line in the low frequency region is attributed to Warburg diffusion within the cathode. From FIGS. 6A and 6B, it is clearly evident that both the batteries exhibit comparable charge-discharge plateaus with slight increase in polarization for 3 mm battery (1980 Q). This could be attributed to comparatively smaller size working electrode and in well agreement with the theory based on formula.

$$R=p*(L/A)$$

Where R is resistance, p is a resistivity of material, L is a length and A is the overall area.

Figure 7A:
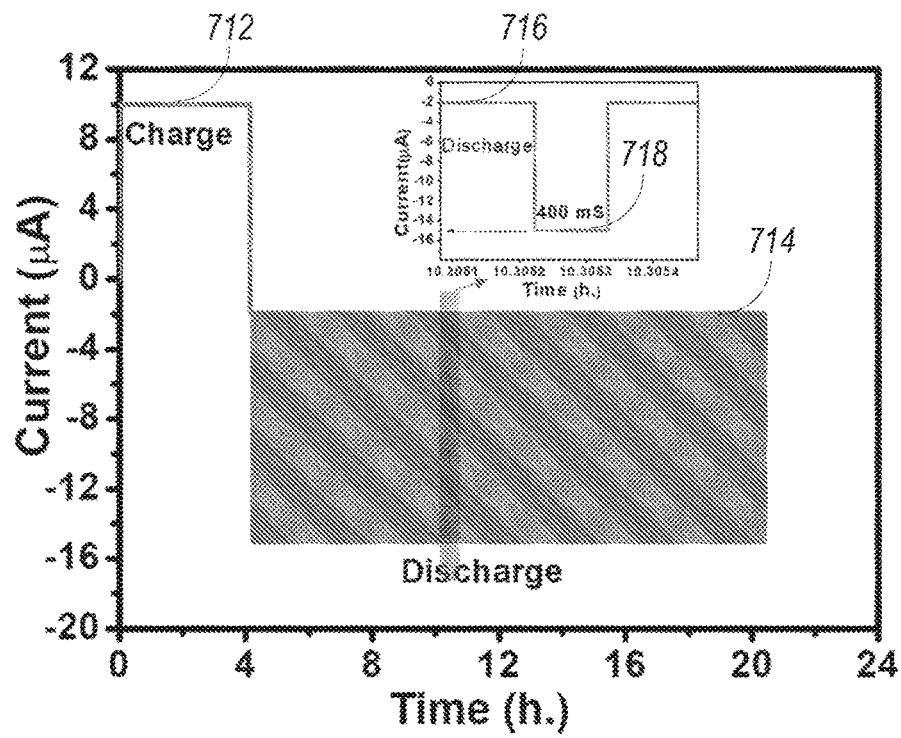
FIGS. 7A and 7B are graphs illustrating the power source attributes as it controls a sensor through cycles of sleep mode and active mode states.
Figure 7B:
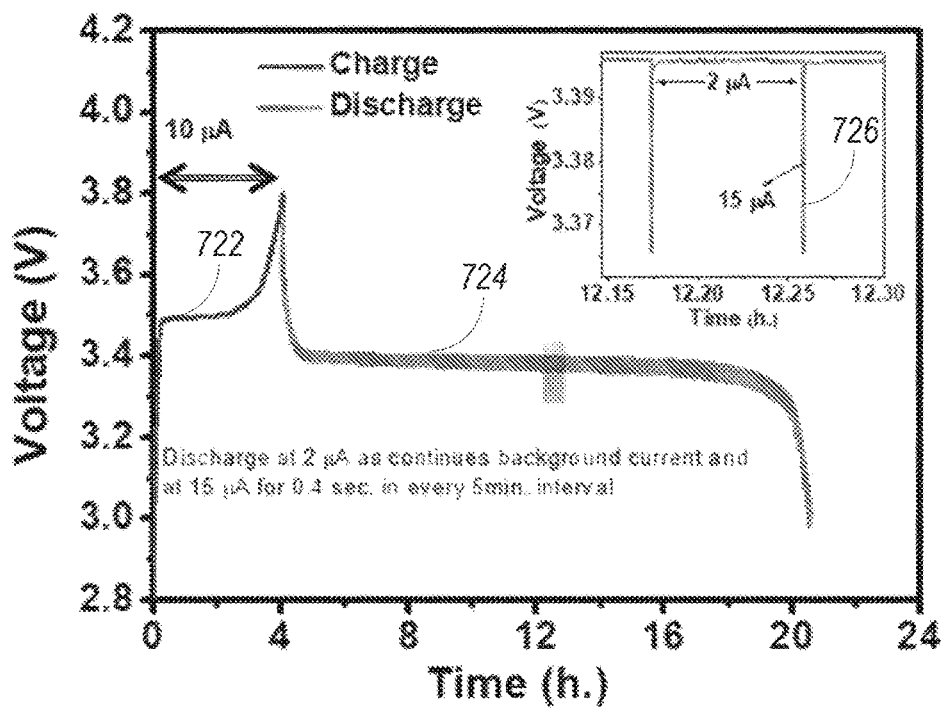

FIGS. 7A and 7B are graphs illustrating the power source attributes as it controls a sensor through cycles of sleep mode and active mode states. Line segment 712 illustrates the charging mode and line segment 714 illustrates the mode switching between sleep mode and active mode. Line segment 716 show a blow up of the sleep mode for one cycle and line segment 718 shows a blow up of the active mode for one cycle.

Battery test as per the sensor requirement includes where Sleep time is 5 mins at 2 µA and wake up time 400 ms at 15 µA.

With the successful packaging of miniatured batteries and demonstration of its feasibility at 120 C using epoxy, it can be important to showcase further its suitability for sensor requirements to use in micro-sensor and microdevices. In this regard, a galvanostatic/potentiostatic instrument was programmed with the sensor requirements and performed on newly packaged 3 mm battery. FIG. 7A reveals the input current conditions during charge-discharge process, for example charging at constant current at 10 µA and discharge current at 15 µA for 400 mS in a regular 5 minutes interval. However, 2 µA of current continues as background output current. FIG. 7B demonstrates output voltage with respect to the time during charge-discharge process. It is noteworthy to know that the performance of 3 mm battery is stable (~16 h.) at 120° C. under given conditions to be used in sensors.

Figure 8A:
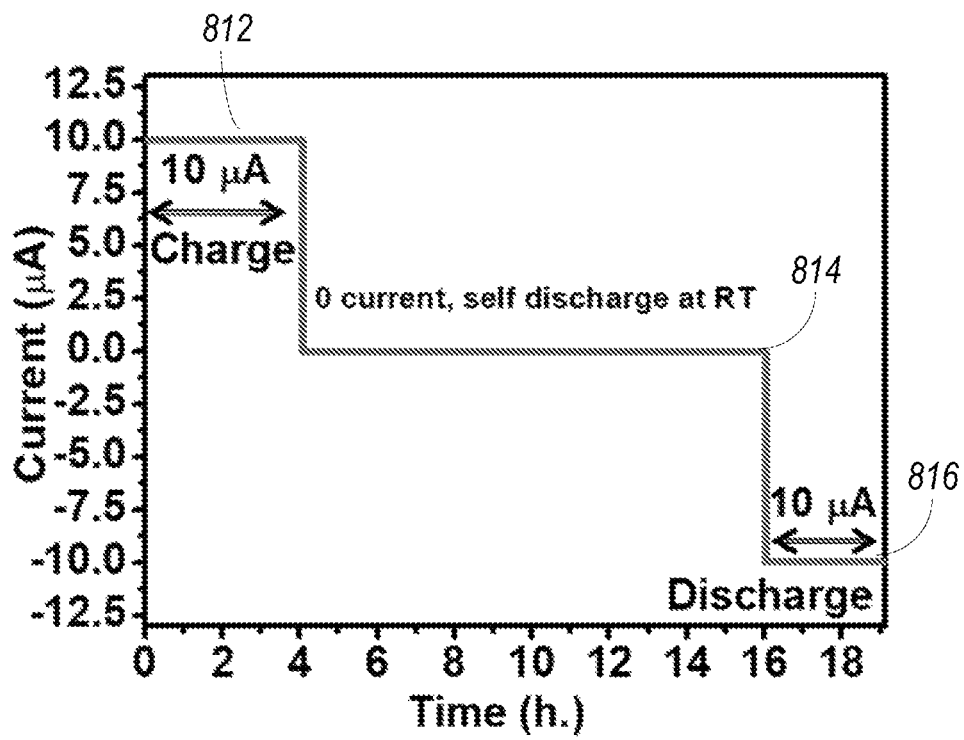
FIGS. 8A and 8B are graphs illustrating the power source attributes during a high temperature charge/discharge test.
Figure 8B:
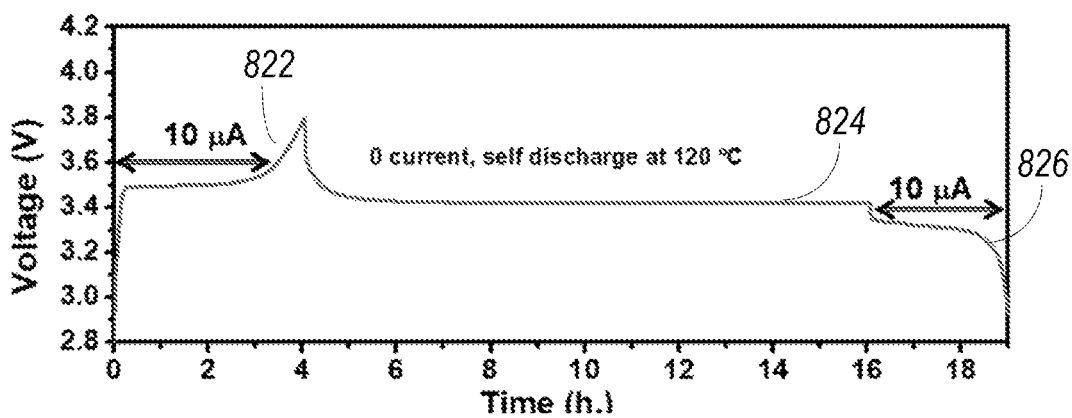

FIGS. 8A and 8B are graphs illustrating the power source attributes during a high temperature charge/discharge test. The test may be referred to as Self Discharge tests at 120° C. Line segment 812 is illustrates a 10 µA charge mode, line segment 814 illustrates a neutral mode with 0 µA flow, and line segment 816 illustrates a 10 µA discharge mode. Line segment 822 is illustrates a 10 µA charge mode, line segment 824 illustrates a neutral mode with 0 µA flow, and line segment 826 illustrates a 10 µA discharge mode.

Batteries are generally affected by self-discharge. Self-discharge is not a manufacturing process related defect but its battery characteristic, however poor fabrication or packaging materials and improper handling can trigger the problem. Self-discharge is irreversible and it is a permanent process, it is important to understand the self-discharge of any battery before qualifying their commercial viability. FIG. 8A illustrates self-discharge experiment performed on 3 mm battery at 120 C, herein charging and discharging at constant current of 10 µA with rest time of 12 h. at 120 C. Interestingly, desirable discharge plateau has been observed even after 12 h. self-discharge at 120 C with as low as 4% capacity fade.

The present disclosure provides a new process flow of fabricating miniaturized rechargeable lithium ion batteries (LIB) that can sustain wide temperatures (−100 to 450° C.), withstand high pressure (up to 50,000 psi), tolerant towards harsh chemicals and deliver exceptional areal capacity (energy density). Advances in the miniaturization of several electronic devices and sensors have occurred at a rate much faster than the miniaturization of powering technologies such as batteries and supercapacitors. The lack of efficient and reliable high energy and power devices with the stability in extreme conditions limits the deployment of autonomous micro-devices and micro-sensors. The currently available miniature batteries and super capacitors have several serious limitations including re-chargeability, (ii) reversibility, (iii) areal energy (Wh/cm$^2$), (iv) power capability (W/cm$^2$), (v) thermal stability (up to 85° C.) and (vi) pressure. However, several electronic devices such as microsensors acquiring real time information related to pressure, temperature etc., at extreme environment conditions demand highly reliable micro/millimeter-scale batteries and super capacitors sustaining temperatures beyond 85° C., pressures up to 50,000 psi and delivering high energy and power.

In conventional miniature battery and super capacitor packaging methods with various dimensions can pose issues in terms of (i) thermal (ii) pressure, (iii) chemical stabilities and (iv) complicated fabrication methods which involves different packaging components including polymers. For instance, coin cell fabrication can require polymer based O-ring to separate cathode and anodes parts and at the same time to hold battery components together. Moreover, electrochemically active components occupy only 5-10% of overall volume of coin cell. Also as we scale down these designs (mm-scale to micron), the significant domination of hardware components in the packaging can affect overall areal energy density. Hence, sizing down to micro/millimeter and packaging them in these sizes can be limiting factors for developing high energy miniaturized batteries and supercapacitors. There may be a critical need to advance novel processing and packaging techniques to develop micro/millimeter batteries that can overcome the current limitations of size, energy, power and robustness.

A process has been developed to fabricate rechargeable lithium batteries and super capacitors that allows design flexibility, easy to manufacture by eliminating several conventional hardware components and works at extreme conditions without losing its aerial capacity and power capability. Using different additive manufacturing process (like 3D printing, CNC, micro electro discharge machining, direct metal laser sintering etc.), a process flow has been developed for batch mode fabrication of battery packaging components that can be scaled down to desired dimensions including micro-meters without much compromising on active area for electrochemically active components such as anode/cathode/electrolytes. The disclosed design allows direct deposition of active battery materials with effective utilization of available space to get overall high areal capacity. Secondly this design allows to use wide range of battery materials which is helpful for different working conditions.

Fabrication Steps for High Temperature Rechargeable LIB and Super Capacitors

In design of casings, the package of the battery includes a cup and lid made from hard metals (such as stainless steel, Cu, Al). These miniaturized energy devices casings may have two parts, a bottom case to hold the cathode materials and a top case for anode materials, an extrusion may be added to the top case which aids in sufficient contact pressure between the anode and cathode materials as shown in FIG. 1. The size and shape of these casings can be tuned as per requirement and applicable to both battery and super capacitors.

Fabrication Steps for High Temperature Rechargeable LIB and Super Capacitors

In design of casings, the package of the battery consists of cup and lid made from hard metals (such as stainless steel, Cu, Al). These miniaturized energy devices casings have two parts, bottom case to hold the cathode materials and top case for anode materials, an extrusion has been added to the top case which aids in sufficient contact pressure between the anode and cathode materials as shown in FIG. 1. The size and shape of these casings can be tuned as per requirement and applicable to both battery and super capacitors.

Cathode materials of battery have their electrochemical properties which are sensitive to the composition (phase and size of particles). Coating them into a micro/millimeter-scale form factor can be a major challenge as conventional physical or chemical deposition techniques have limitation for processing such materials. The disclosed design allows depositing wide range of thermally stable cathode materials directly on these casings. Slurry made from active cathode materials such as $LiFePO_4/C$, $LiMn_2O_4$, $LiNi_{1/3}Mn_{1/3}Co_{1/3}O_2$ etc., along with conductive carbon and binders can be coated conformally on these casings using standard techniques like spin/spray/drop/coatings.

The key components of a Li-ion battery may include the thermally stable anode, its capacity with respect to cathode at extreme conditions governs the energy density of the battery. The disclosed design allows to direct deposit different anode materials such as Si, Sn, graphite, Li and their composites. Casings may be compatible for wide range of deposition techniques such as chemical vapor deposition (for Si and lithium), sputtering/evaporations (for Sn), electrodeposition (for Sn and Li), pre-formulated slurry coating (graphite or other nanocarbons).

Electrolyte/Separators

Since anode and cathode materials may be directly deposited on casings, the battery configuration would work (a) by filling electrolyte in the available space between cup and lid (without using traditional separators) or (b) with any traditional separator by wetting it with appropriate thermally stable electrolytes or (c) using semi-solid/solid electrolytes by filling the space between cup and lid.

Dielectric Insulation

High dielectric material may be used for isolating cup from lid to stop the short circuit between anode and cathode. This high dielectric material may be insulated on the top of the lid.

Packaging with High Thermal Epoxies

One of critical parameters to fabricate micro/millimeter scale lithium batteries can be epoxy or sealant or adhesive, which is electrically insulated in nature, chemically inactive with battery components and at the same time to bind them tightly to regulate liberated electrons for external circuit. It may be very important to know that the stability of selected epoxies with electrodes/electrolytes because it involves electrical energy (voltage) along with thermal energy to make them harder towards their stability. These epoxies should have capacities to withstand high pressure and temperature without rupturing or cracking. Secondly it should have ability to protect battery components from harsh chemicals and provide high mechanical strength.

Herein, urethane epoxies may be used to seal micro/millimeter batteries. The important characteristics of this epoxy may be that "it cures at room temperature" and it gives conformal coating and sealed hermetically. By adding urethane with limestone, this epoxy allows to reduce coefficient of temperature expansion. Moreover, it has been found chemically resistant to most of organic solvents, thermally stable up to 450° C., and provides a mechanical strength.

As a person skilled in the art will readily appreciate, the above description is meant as an illustration of implementation of the principles this disclosure. This description is not intended to limit the scope or application of this system in that the system is susceptible to modification, variation and change, without departing from the spirit of this disclosure, as defined in the following claims.

The invention claimed is:

1. A battery for a micro-device comprising:
a cup being formed of a hard metal material and walls of the cup defining a cavity;
an internal surface of the cavity being deposited with one of an anode and a cathode material;
a lid formed of a hard metal material and having a base, the base configured to rest on a top surface of the walls, closing off the cavity of the cup;
a bottom surface of the lid positioned on top of the cavity such that it closes off the cavity and being deposited with the other of the anode or the cathode material;
electrolytes being contained in the cavity;
a dielectric material being positioned between the top surface of the walls of the cup and the bottom surface of the lid to electrically isolate the cup from the lid; and
wherein the lid includes a protrusion that extends from a middle of the lid and into the cavity, and wherein the other of the anode or the cathode material is coated on surfaces of the protrusion and the bottom surface of the base of the lid.

2. The battery according to claim 1, further comprising an epoxy for sealing an opening in a space between the walls of the cup and the base of the lid.

3. The battery according to claim 1, wherein the cathode material comprises at least one of $LiFePO_4/C$, $LiMn_2O_4$, $LiNi_{1/3}Mn_{1/3}Co_{1/3}O_2$.

4. The battery according to claim 1, wherein the anode material comprises at least one of Si, Si-carbon, Si—Li alloy, Sn, graphite, and Li.

5. The battery according to claim 1, wherein the thickness of the walls is between 50 nanometers and 250 nanometers.

6. The battery according to claim 1, wherein at least one of:
the cup comprises at least one of stainless steel, Cu, and Al; and
the lid comprises at least one of stainless steel, Cu, and Al.

7. The battery according to claim 1, wherein the one of the anode and the cathode material is coated onto a bottom and side surfaces of the cup.

8. The battery according to claim 1, wherein the cathode material is deposited onto the cup and the anode material is deposited onto the lid.

9. The battery according to claim 1, wherein the cathode material is deposited onto the lid and the anode material is deposited onto the cup.

10. The battery according to claim 1, wherein the dielectric is deposited onto the lid.

11. The battery according to claim 1, wherein the electrolyte is filled in the cavity without using separators.

12. The battery according to claim 1, wherein the cavity is filled with a separator that is wetted with thermally stable electrolytes.

13. The battery according to claim 1, where the cavity is filled with solid or semi-solid electrolytes.

14. A power source for a device comprising:
a cup being formed of a hard metal material and walls of the cup defining a cavity;
a lid formed of a hard metal material and having a base;
the base of the lid configured to rest on a top surface of the walls, closing off the cavity;
electrolytes being contained in the cavity; and
a dielectric material being positioned between the top surface of the walls of the cup and a bottom surface of the lid;
wherein an internal surface of the cavity is deposited with one of an anode and a cathode material, and a bottom surface of the lid is positioned on top of the cavity such that it closes off the cavity and is deposited with the other of the anode or the cathode material; and
wherein the lid includes a protrusion that extends from a middle of the lid and into the cavity, and wherein the other of the anode or the cathode material is coated on surfaces of the protrusion and the bottom surface of the base of the lid.

15. A method for forming the battery of claim 1, the method comprising:
forming the cup from the hard metal material, wherein walls of the cup define the cavity;
forming the lid from the hard metal material, wherein the lid is configured to rest on the top surface of the walls of the cup, closing off the cavity;
providing electrolytes into the cavity;
providing the dielectric material between the top surface of the walls of the cup and the bottom surface of the lid; and
sealing the cup to the lid to contain the electrolytes in the cavity.

16. The method of claim 15, wherein the at least one of the lid and the cup are 3D-printed.

17. The method of claim 15, wherein the thickness of the walls is between 50 nanometers and 250 nanometers.

18. The method of claim 15, further comprising depositing one of a cathode material or an anode material onto the cup.

19. The method of claim 15, further comprising depositing one of a cathode material or an anode material onto the lid.

* * * * *